(No Model.)

E. M. KISSELL.
FERTILIZER SOWER.

No. 292,320.  Patented Jan. 22, 1884.

Attest.
Gus A. Meyer
Edward W. Rector

Inventor.
Emanuel M. Kissell
by Stem & Peck
his attys

N. PETERS. Photo-Lithographer. Washington, D. C.

UNITED STATES PATENT OFFICE.

EMANUEL M. KISSELL, OF SPRINGFIELD, OHIO, ASSIGNOR OF ONE-HALF TO P. P. MAST & CO., OF SAME PLACE.

FERTILIZER-SOWER.

SPECIFICATION forming part of Letters Patent No. 292,320, dated January 22, 1884.

Application filed January 6, 1883. (No model.)

*To all whom it may concern:*

Be it known that I, EMANUEL M. KISSELL, a citizen of the United States, residing at Springfield, in the county of Clarke and State of Ohio, have invented certain new and useful Improvements in Fertilizer-Sowers, of which the following is a full, clear, and exact description, reference being had to the accompanying drawings, making part of this specification.

My improvements relate to the feed mechanism, and have for their object the simplification of the construction and general better working of the machine. The novelty consists, first, in the combination, with the hopper, of one or more horizontally-rotating feed-disks made of glass and projecting through openings in the hopper, whereby corrosion is prevented and a more efficient distribution of the fertilizer secured; secondly, in the combination, with the hopper and the horizontally-rotating glass disks, of cut-off slides and scrapers, whereby the proper flow of the fertilizer is secured, directed, and regulated; thirdly, in the combination and arrangement of the driving shaft or axle and the gearing connecting the same to the feed-disks; and, generally, in details of construction, all as will be herewith set forth and specifically claimed.

Figure 1:
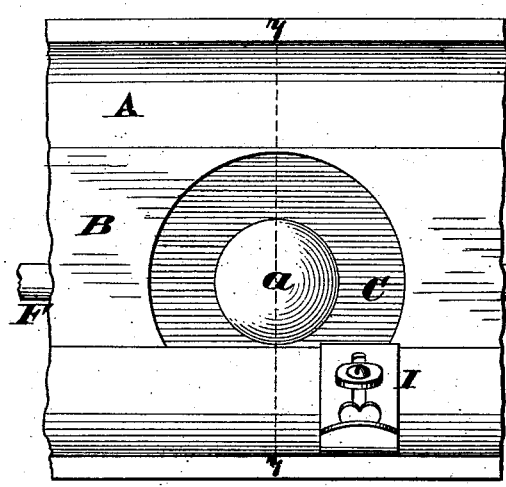
Figure 3:
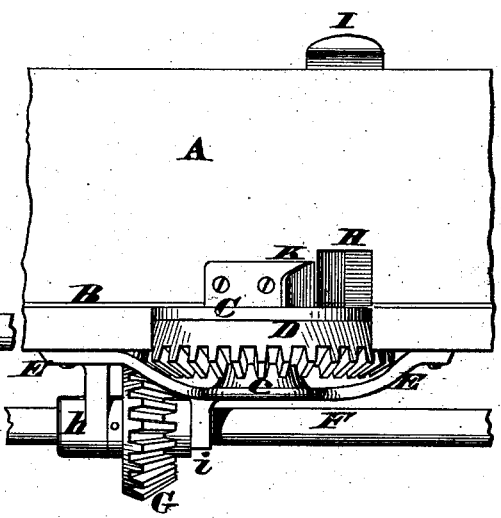
Figure 2:
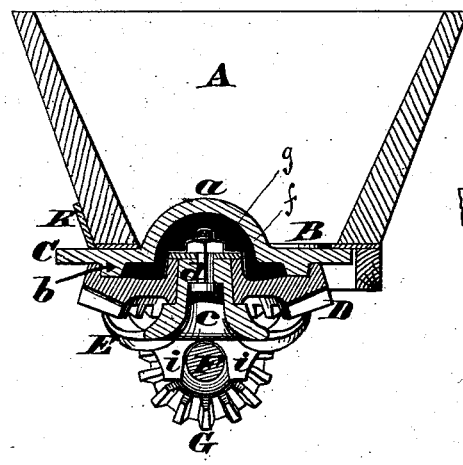
Figure 4:
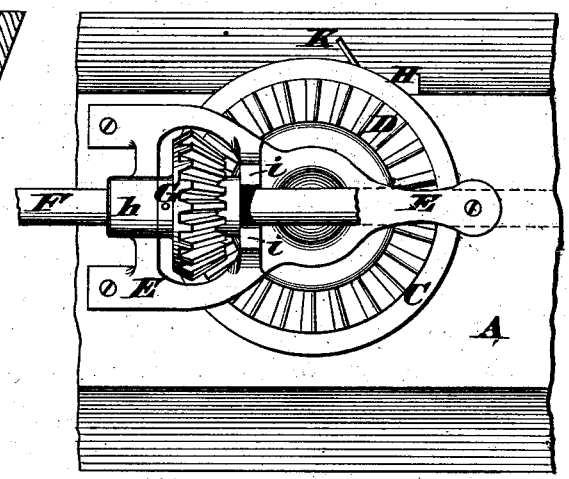
Figure 5:
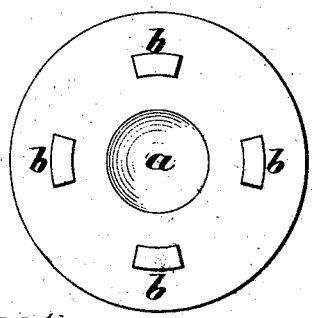
Figure 6:
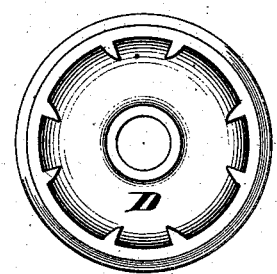

In the accompanying drawings, Figure 1 is a plan of a portion of the hopper of my implement. Fig. 2 is a vertical section of the same, taken at the line 7 7. Fig. 3 is a rear elevation of the hopper. Fig. 4 is a plan of the under side of the same, a portion of the shaft being broken away and its position indicated in dotted lines. Fig. 5 is a plan of the under side of the feed-wheel. Fig. 6 is a plan of the upper side of the gear-wheel that engages with and drives said feed-wheel.

The same reference-letters indicate like parts in all the figures.

With this class of machines, as is well known, great trouble is experienced on account of the corrosion and consequent clogging of the feed-mechanism where metal alone is employed in its construction, owing to the acids contained in most fertilizers and the frequent damp or wet state in which they are required to be used, and one of the chief objects of my present invention is to remedy this difficulty by using feed-disks made of glass, or else of enameled metal, the former being preferable on account of its cheapness.

The hopper A of the machine, which may be of the usual or any suitable construction, has circular openings cut through its bottoms at such points as it is desired to have the feed-disks work. There are usually eight of these openings equidistant and in line, and arranged one over or in line with each of the cultivator teeth or hoes of the machine, and fitting into the bottom of the hopper is a zinc or galvanized-metal plate, B, with circular openings to correspond with the openings in the bottom of the hopper before mentioned, but of slightly less diameter than the openings in the bottom of the hopper, so as to form an overlapping ledge. Into each of these openings in the bottom of the hopper, and resting upon the ledges formed by the plate B, is placed the circular feed-disk C made of glass, preferably with a central dome, $a$, and upon the bottom of each disk are lugs or dowels $b$, adapted to enter corresponding recesses in the immediately-subjacent metal gear-wheel D, so that by means of these dowels or lugs each glass is locked to and caused to rotate with its gear-wheel.

I have represented the gear-wheels D with beveled gears, though they may be plain crown-gears, if desired, to economize metal. Each of these gears D is mounted upon and supported by a hanger-bracket, E, of the shape shown, which has a central upwardly-extending sleeve, $c$, over which the gear D is slipped and upon which it revolves. A bolt, $d$, inserted from below through the sleeve $c$, has upon its upper end, which projects through the gear D, a washer, $f$, and nut $g$, which serve to unite permanently each of the gears D and its bracket E. Each bracket is secured at the extremity of its arms to the bottom of the hopper by means of screws, as clearly shown in Fig. 3. In addition to the bearing for the gear D each bracket has a pendent bearing-sleeve or journal, $h$, through which is inserted the through-shaft or axle F, which operates all of the disks, and secured upon this axle, under each of the gears D, is a small meshing driving-pinion, G. These pinions are provided with hubs or collars, the one of which bears against the journal $h$, and the other against shoulders $i$, extending down from the bracket E on each side of and partially accompanying the shaft F, as shown. By this means the pinions are held from slipping endwise upon the shaft, and any suitable key may be used to prevent their turning on the shaft. The shaft is so held at its ends that it can be withdrawn whenever it is desired to replace any of the feed-disks or other parts should breakage occur.

From the above construction it will be seen that I have produced a very simple, compact, and secure means for driving the feed-disks, and have provided for the ready removal of any one of them, without disturbing the rest, by simply withdrawing the shaft and unscrewing any one of the brackets. The discharge-openings H in the hopper are covered by upwardly and downwardly adjustable slides I, which can be independent of each other or be made to move simultaneously, as desired. I have represented these discharge-openings at the periphery of the disks at the point where they emerge from the hopper, though I do not limit myself to this location, for they may be placed at any point between the periphery of the disks and a line taken diametrically through the disk in the line of draft of the machine. Upon the outer side of the hopper, over the projecting portion of each disk, is secured a metal scraper, k, whose lower edge fits close upon the surface of the disk, and which is so inclined as to cause the fertilizer which is carried out upon the disk to be swept over its edge and deposited at the point desired to conduct it to the ground.

If desired, suitable stirrers or agitators—those with an endwise movement being preferred—may be used in the hopper to prevent any clogging of the fertilizer.

By the above construction it will be seen that the revolution of the shaft F causes the rotation of the feed-disks, and the consequent carrying of the fertilizer out of the hopper through the discharge-openings, and by the employment of glass for the construction of the feed-disks corrosion is prevented and a more efficient machine produced.

I am aware that rollers made of glass have been proposed for use in grain-drills and seed-droppers, such as shown in Patents Nos. 257,951 and 83,491; but my invention differs essentially therefrom both in construction and mode of operation, as will be apparent upon inspection.

I am also aware that horizontally-rotating metal feed-disks projecting through openings in the side of the hopper have heretofore been proposed, as shown in Patents Nos. 253,454, 256,430, and 261,517, and I therefore lay no claim herein to such features, broadly.

Having thus fully described my invention, I claim—

1. In the feed mechanism of fertilizers, the combination, with the hopper, of horizontally-rotating feed-disks made of glass, substantially as described.

2. In the feed mechanism of fertilizers, the combination, with the hopper, of horizontally-rotating glass feed-disks projecting through openings in the hopper, substantially as described.

3. In the feed mechanism of fertilizers, the combination, with the horizontally-rotating glass feed-disks projecting through openings in the hopper, of discharge-openings regulated by vertically-moving gates or slides, and stationary scrapers for removing and directing the flow of the fertilizer from the disks, substantially as described.

4. In the feed mechanism of fertilizers, the combination, with the horizontally-rotating glass feed-disks, of immediately subjacent supporting and actuating gears, said disks and gears being locked together by means of lugs or dowels, substantially as and for the purpose specified.

5. The bracket E, provided with a bearing for the gear D, and with a journal for the through-shaft or axle, in combination with the rotating glass feed-disk, the gear D, pinion G, and through-shaft F, the parts being constructed and relatively arranged in the manner and for the purpose specified.

EMANUEL M. KISSELL.

Witnesses:
Jos. A. Skinner,
Chas. Amey.